(12) United States Patent
Verma et al.

(10) Patent No.: US 11,962,041 B2
(45) Date of Patent: Apr. 16, 2024

(54) METHODS FOR MANUFACTURING FUEL CELL INTERCONNECTS USING 3D PRINTING

(71) Applicant: BLOOM ENERGY CORPORATION, San Jose, CA (US)

(72) Inventors: Avinash Verma, Cupertino, CA (US); Chockkalingam Karuppaiah, Cupertino, CA (US); Harald Herchen, Los Altos, CA (US); Cheng-Yu Lin, Cupertino, CA (US); Martin Perry, Mountain View, CA (US)

(73) Assignee: BLOOM ENERGY CORPORATION, San Jose, CA (US)

(*) Notice: Subject to any disclaimer, the term of this patent is extended or adjusted under 35 U.S.C. 154(b) by 230 days.

(21) Appl. No.: 17/221,147

(22) Filed: Apr. 2, 2021

(65) Prior Publication Data

US 2021/0313658 A1 Oct. 7, 2021

Related U.S. Application Data

(60) Provisional application No. 63/004,587, filed on Apr. 3, 2020.

(51) Int. Cl.
*H01M 50/522* (2021.01)
*B22F 3/24* (2006.01)
*B22F 10/28* (2021.01)
*B22F 10/50* (2021.01)
*B22F 10/62* (2021.01)
*B33Y 10/00* (2015.01)
(Continued)

(52) U.S. Cl.
CPC .......... *H01M 50/522* (2021.01); *B22F 10/28* (2021.01); *B22F 10/50* (2021.01); *B22F 10/62* (2021.01); *B33Y 40/20* (2020.01); *B33Y 70/00* (2014.12); *B33Y 80/00* (2014.12); *H01M 8/0208* (2013.01); *B22F 2003/242* (2013.01); *B22F 2201/03* (2013.01); *B22F 2201/11* (2013.01); *B22F 2301/20* (2013.01); *B22F 2301/35* (2013.01); *B22F 2998/10* (2013.01); *B33Y 10/00* (2014.12)

(58) Field of Classification Search
None
See application file for complete search history.

(56) References Cited

U.S. PATENT DOCUMENTS 8,840,833 B1 9/2014 Janousek et al.
8,962,219 B2 2/2015 Couse et al.
(Continued)

FOREIGN PATENT DOCUMENTS

WO WO-2015027255 A1 * 3/2015 ............ B22F 1/0014

OTHER PUBLICATIONS

O'Sullivan et al, WO 2015027255, English Translation from FIT (Year: 2015).*

*Primary Examiner* — Colin W. Slifka
(74) *Attorney, Agent, or Firm* — THE MARBURY LAW GROUP PLLC

(57) ABSTRACT

A method of forming a fuel cell interconnect includes depositing a Cr alloy powder, sintering the Cr alloy powder, and repeating the depositing and the sintering to form the fuel cell interconnect. The Cr alloy powder may include a pre-alloyed powder containing from about 4 wt. % to about 6 wt. % Fe, and from about 94 wt. % to about 96 wt. % Cr.

18 Claims, 5 Drawing Sheets

(51) Int. Cl.
*B33Y 40/20* (2020.01)
*B33Y 70/00* (2020.01)
*B33Y 80/00* (2015.01)
*H01M 8/0208* (2016.01)

(56) References Cited

U.S. PATENT DOCUMENTS

| | | |
|---|---|---|
| 9,196,909 B2 | 11/2015 | Darga et al. |
| 9,368,809 B2 | 6/2016 | Prasad et al. |
| 9,368,810 B2 | 6/2016 | Darga et al. |
| 9,452,475 B2 | 9/2016 | Armstrong et al. |
| 9,478,812 B1 | 10/2016 | Darga et al. |
| 9,502,721 B2 | 11/2016 | Herchen et al. |
| 9,559,365 B1 | 1/2017 | Kapoor |
| 9,673,457 B2 | 6/2017 | Srivatsan et al. |
| 9,847,520 B1 | 12/2017 | Majagi et al. |
| 9,923,211 B2 | 3/2018 | Batawi et al. |
| 9,958,406 B1 | 5/2018 | Lin et al. |
| 9,993,874 B2 | 6/2018 | Shivanath et al. |
| 10,050,298 B2 | 8/2018 | Huynh et al. |
| 10,079,393 B1 | 9/2018 | Verma et al. |
| 10,873,092 B2 | 12/2020 | Khurana et al. |
| 2009/0068055 A1 | 3/2009 | Sreedhara et al. |
| 2013/0129557 A1 | 5/2013 | Herchen et al. |
| 2013/0230644 A1 | 9/2013 | Armstrong et al. |
| 2015/0221957 A1 | 8/2015 | Herchen et al. |
| 2015/0244004 A1 | 8/2015 | Shivanath et al. |
| 2015/0311538 A1 | 10/2015 | Batawi et al. |
| 2015/0357669 A1 | 12/2015 | Huynh et al. |
| 2018/0248202 A1 | 8/2018 | Khurana et al. |
| 2019/0372132 A1 | 12/2019 | Gasda et al. |

\* cited by examiner

METHODS FOR MANUFACTURING FUEL CELL INTERCONNECTS USING 3D PRINTING

FIELD

The present invention is directed to fuel cell interconnect manufacturing methods, and specifically to methods of three dimensional (3D) printing fuel cell interconnects.

BACKGROUND

A typical solid oxide fuel cell stack includes multiple solid oxide fuel cells separated by metallic interconnects that provide both electrical connection between adjacent cells in the stack and channels for delivery and removal of a fuel and an oxidant.

SUMMARY

According to various embodiments, a method of forming a fuel cell interconnect includes depositing a Cr alloy powder, sintering the Cr alloy powder, and repeating the depositing and the sintering to form the fuel cell interconnect. The Cr alloy powder may comprise a pre-alloyed Cr—Fe powder containing from about 4 wt. % to about 6 wt. % Fe, and from about 94 wt. % to about 96 wt. % Cr.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention. It will also be understood that the term "about" may refer to a minor measurement errors of, for example, 5 to 10%.

Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

The term "fuel cell stack," as used herein, means a plurality of stacked fuel cells that can optionally share a common fuel inlet and exhaust passages or risers. The "fuel cell stack," as used herein, includes a distinct electrical entity which contains two end plates which are connected directly to power conditioning equipment and the power (i.e., electricity) output of the stack or comprises a portion of a fuel cell column that contains terminal plates which provide electrical output.

Figure 1A:
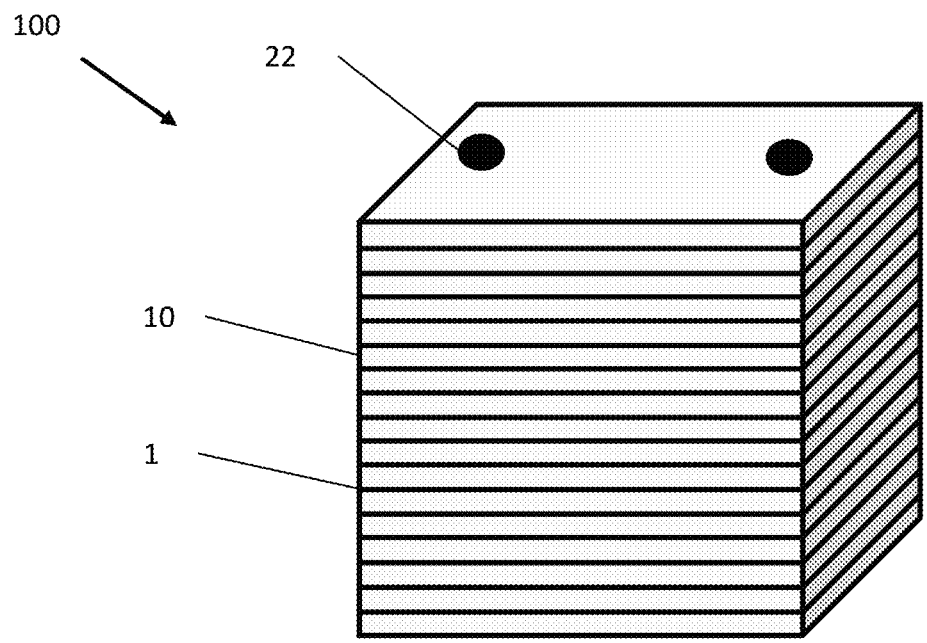
FIG. 1A is a perspective view of a SOFC stack, according to various embodiments of the present disclosure.
Figure 1B:
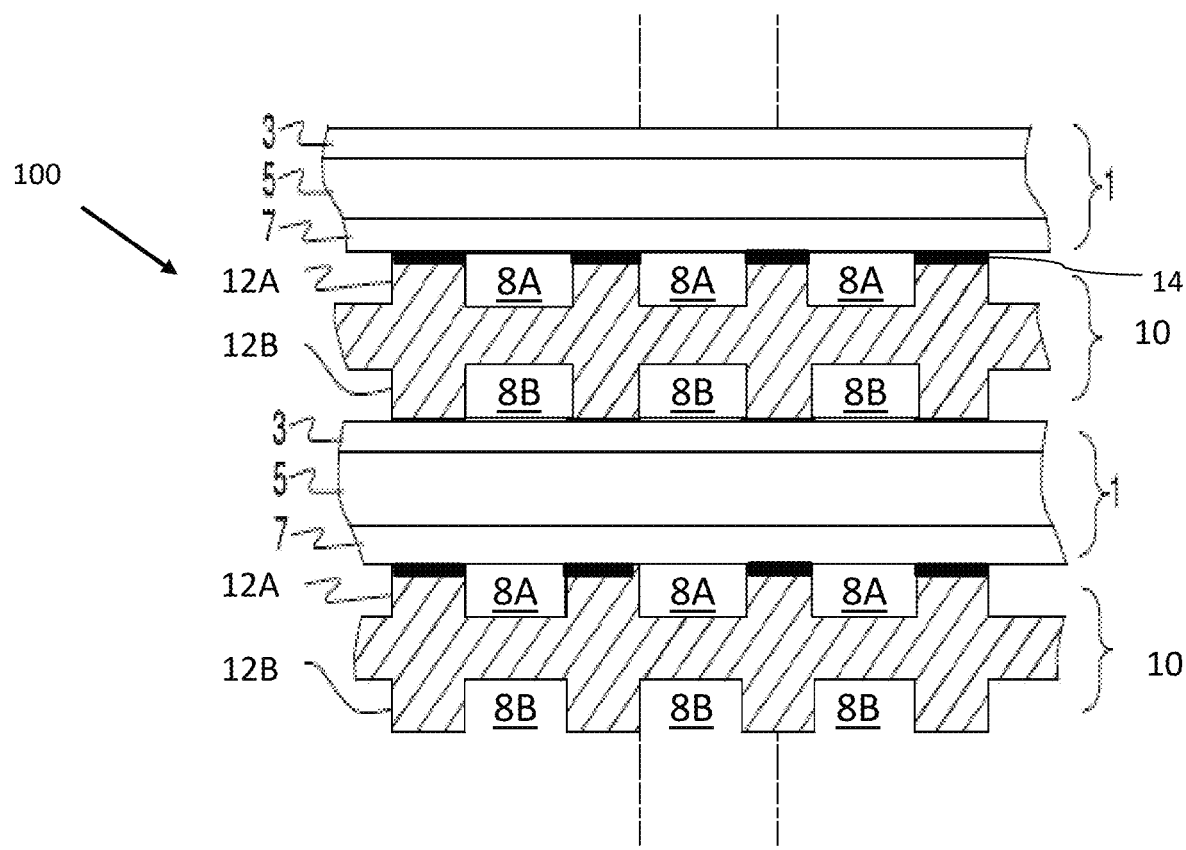
FIG. 1B is a cross-sectional view of a portion of the stack of FIG. 1A.

FIG. 1A is a perspective view of a fuel cell stack 100, and FIG. 1B is a sectional view of a portion of the stack 100, according to various embodiments of the present disclosure. Referring to FIGS. 1A and 1B, the stack 100 may be a solid oxide fuel cell (SOFC) stack that includes fuel cells 1 separated by interconnects 10. Referring to FIG. 1B, each fuel cell 1 comprises a cathode 3, a solid oxide electrolyte 5, and an anode 7.

Various materials may be used for the cathode 3, electrolyte 5, and anode 7. For example, the anode 7 may comprise a cermet layer comprising a nickel containing phase and a ceramic phase. The nickel containing phase may consist entirely of nickel in a reduced state. This phase may form nickel oxide when it is in an oxidized state. Thus, the anode 7 is preferably annealed in a reducing atmosphere prior to operation to reduce the nickel oxide to nickel. The nickel containing phase may include other metals in additional to nickel and/or nickel alloys. The ceramic phase may comprise a stabilized zirconia, such as yttria and/or scandia stabilized zirconia and/or a doped ceria, such as gadolinia, yttria and/or samaria doped ceria.

The electrolyte 5 may comprise a stabilized zirconia, such as scandia stabilized zirconia (SSZ), scandia and ceria stabilized zirconia, scandia, ceria and ytterbia stabilized zirconia, or yttria stabilized zirconia (YSZ). Alternatively, the electrolyte 5 may comprise another ionically conductive material, such as a doped ceria.

The cathode 3 may comprise a layer of an electrically conductive material, such as an electrically conductive perovskite material, such as lanthanum strontium manganite (LSM). Other conductive perovskites, such as LSCo, etc., or metals, such as Pt, may also be used. The cathode 3 may also contain a ceramic phase similar to the anode 7. The electrodes and the electrolyte may each comprise one or more sublayers of one or more of the above described materials.

Fuel cell stacks are frequently built from a multiplicity of fuel cells 1 in the form of planar elements, tubes, or other geometries. Although the fuel cell stack 100 in FIG. 1 is vertically oriented, fuel cell stacks may be oriented horizontally or in any other direction. Fuel and air may be provided to the electrochemically active surface, which can be large. For example, fuel may be provided through fuel conduits 22 (e.g., fuel riser openings) formed in each interconnect 10 and fuel cell 1, while air may be provided from the side of the stack between air side ribs of the interconnects 10.

Each interconnect 10 electrically connects adjacent fuel cells 1 in the stack 100. In particular, an interconnect 10 may electrically connect the anode 7 of one fuel cell 1 to the cathode 3 of an adjacent fuel cell 1. FIG. 1B shows that the lower fuel cell 1 is located between two interconnects 10. A Ni mesh (not shown) may be used to electrically connect the interconnect 10 to the anode 7 of an adjacent fuel cell 1.

Each interconnect 10 includes fuel-side ribs 12A that at least partially define fuel channels 8A and air-side ribs 12B that at least partially define oxidant (e.g., air) channels 8B. The interconnect 10 may operate as a gas-fuel separator that separates a fuel, such as a hydrocarbon fuel, flowing to the fuel electrode (i.e. anode 7) of one cell in the stack from oxidant, such as air, flowing to the air electrode (i.e. cathode 3) of an adjacent cell in the stack. At either end of the stack 100, there may be an air end plate or fuel end plate (not shown) for providing air or fuel, respectively, to the end electrode.

Each interconnect 10 may be made of or may contain electrically conductive material, such as a metal alloy (e.g., chromium-iron alloy) which has a similar coefficient of thermal expansion (CTE) to that of the solid oxide electrolyte in the cells (e.g., a CTE difference of 0-10%). For example, the interconnects 10 may comprise a metal (e.g., a chromium-iron alloy, such as 4-6 weight percent iron (e.g., 5 weight percent iron), optionally 1 or less weight percent yttrium, and balance chromium alloy), and may electrically connect the anode or fuel-side of one fuel cell 1 to the cathode or air-side of an adjacent fuel cell 1. If the interconnect 10 comprises a chromium-iron alloy, then iron rich regions 14 may be formed at the top of the fuel-side ribs 12A. An electrically conductive contact layer, such as a nickel contact layer, may be provided between anodes 7 and each interconnect 10. Another optional electrically conductive contact layer may be provided between the cathodes 3 and each interconnect 10.

Figure 2A:
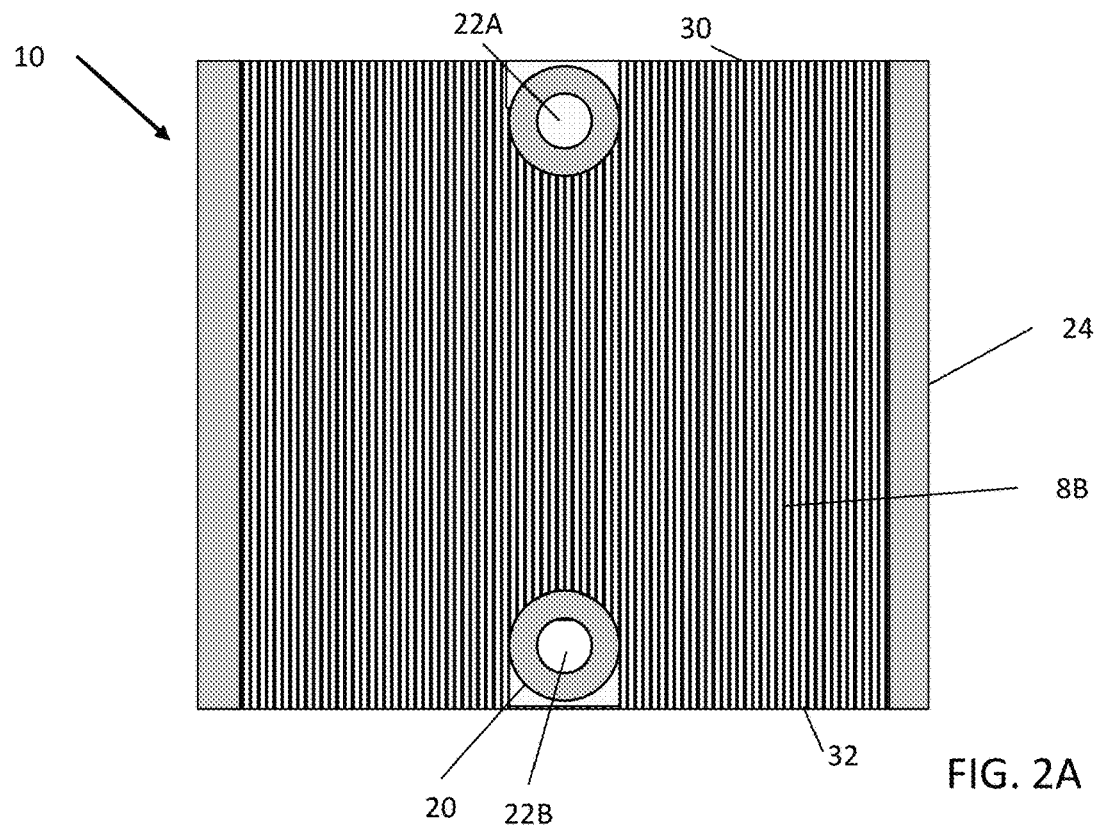
FIG. 2A is a plan view of an air side of an interconnect, according to various embodiments of the present disclosure.
Figure 2B:
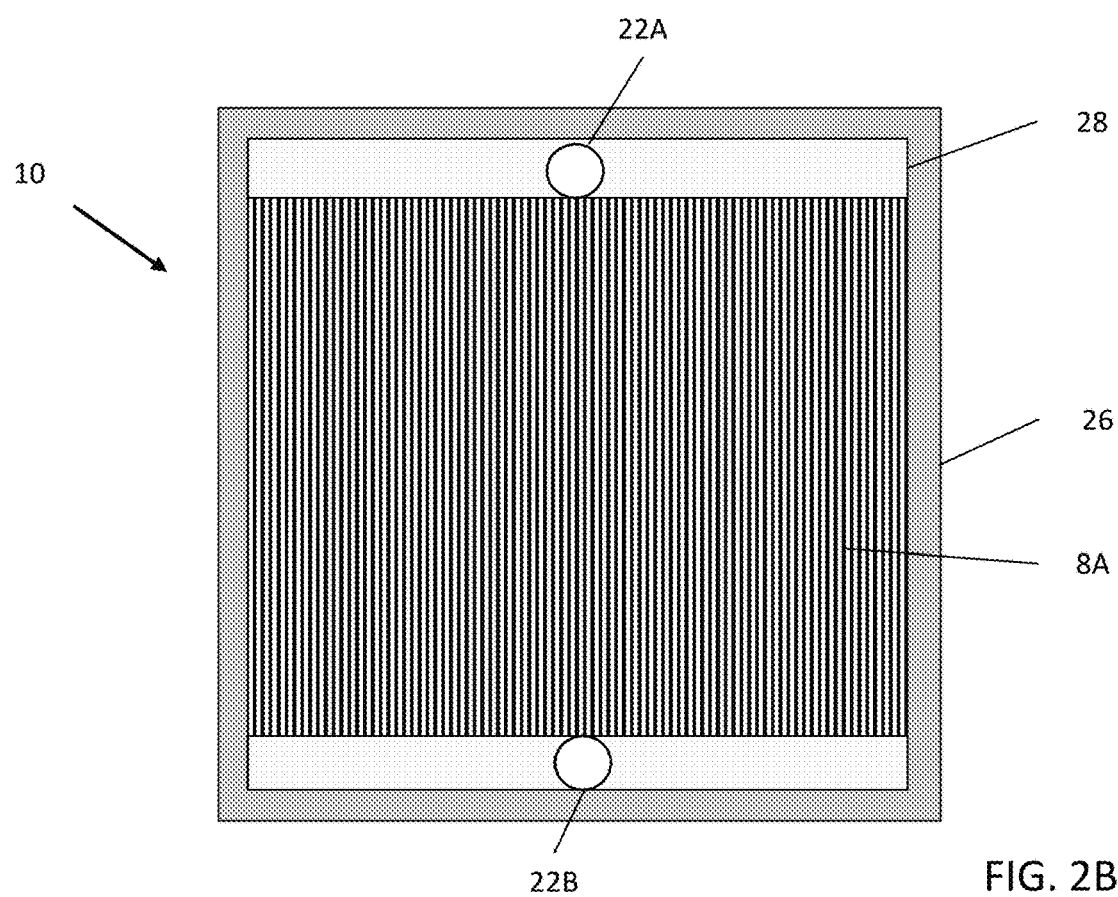
FIG. 2B is a plan view of a fuel side of the interconnect of FIG. 2A.

FIG. 2A is a top view of the air side of the interconnect 10, and FIG. 2B is a top view of a fuel side of the interconnect 10, according to various embodiments of the present disclosure. Referring to FIGS. 1B and 2A, the air side includes the air channels 8B that extend from opposing first and second edges 30, 32 of the interconnect 10. Air flows through the air channels 8B to a cathode 3 of an adjacent fuel cell 1. Ring seals 20 may surround fuel inlet and outlet holes (which form parts of respective fuel inlet and outlet risers) 22A, 22B of the interconnect 10, to prevent fuel from contacting the cathode. Strip-shaped peripheral seals 24 are located on peripheral portions of the air side of the interconnect 10. The seals 20, 24 may be formed of a glass or glass-ceramic material. The peripheral portions may be an elevated plateau which does not include ribs or channels. The surface of the peripheral regions may be coplanar with tops of the ribs 12B.

Referring to FIGS. 1B and 2B, the fuel side of the interconnect 10 may include the fuel channels 8A and fuel manifolds 28. Fuel flows from the fuel inlet hole 22A, which forms part of the fuel inlet riser, into the adjacent manifold 28, through the fuel channels 8A, and to an anode 7 of an adjacent fuel cell 1. Excess fuel may flow into the other fuel manifold 28 and then into the fuel outlet hole 22B. A frame seal 26 is disposed on a peripheral region of the fuel side of the interconnect 10. The peripheral region may be an elevated plateau which does not include ribs or channels. The surface of the peripheral region may be coplanar with tops of the ribs 12A.

Figure 3A:
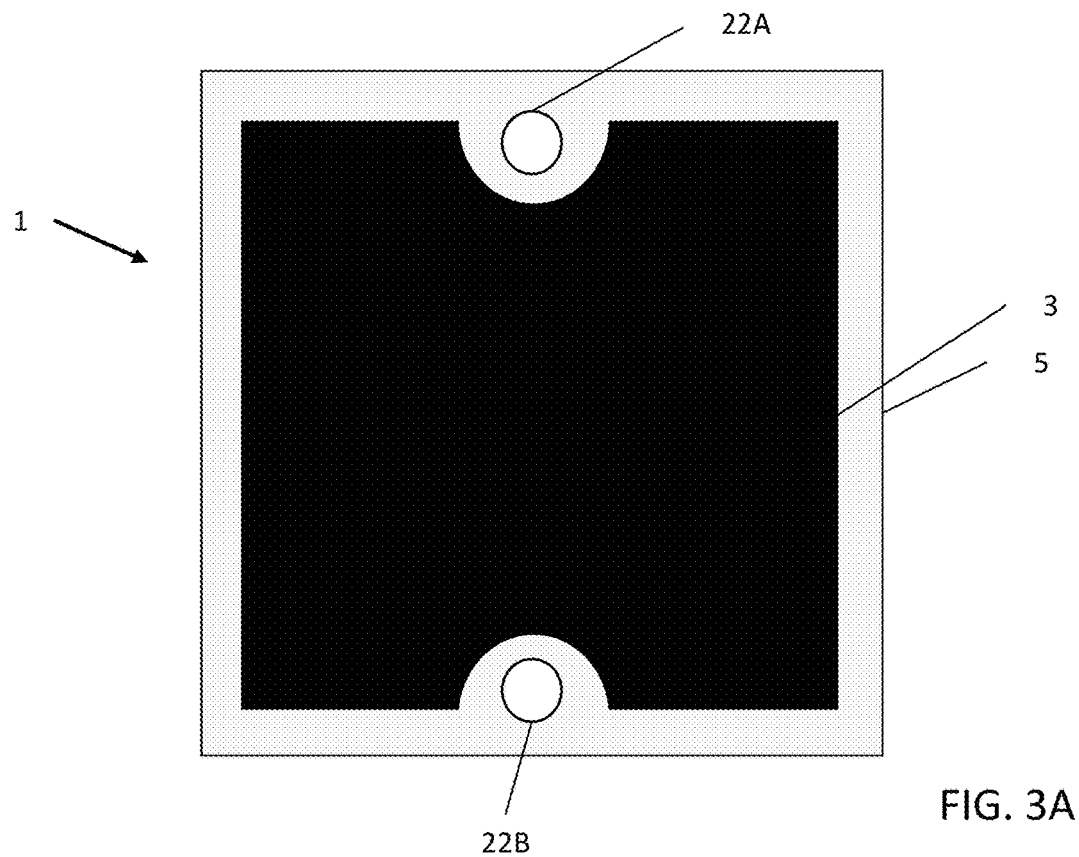
FIG. 3A is a plan view of an air side of a fuel cell, according to various embodiments of the present disclosure.
Figure 3B:
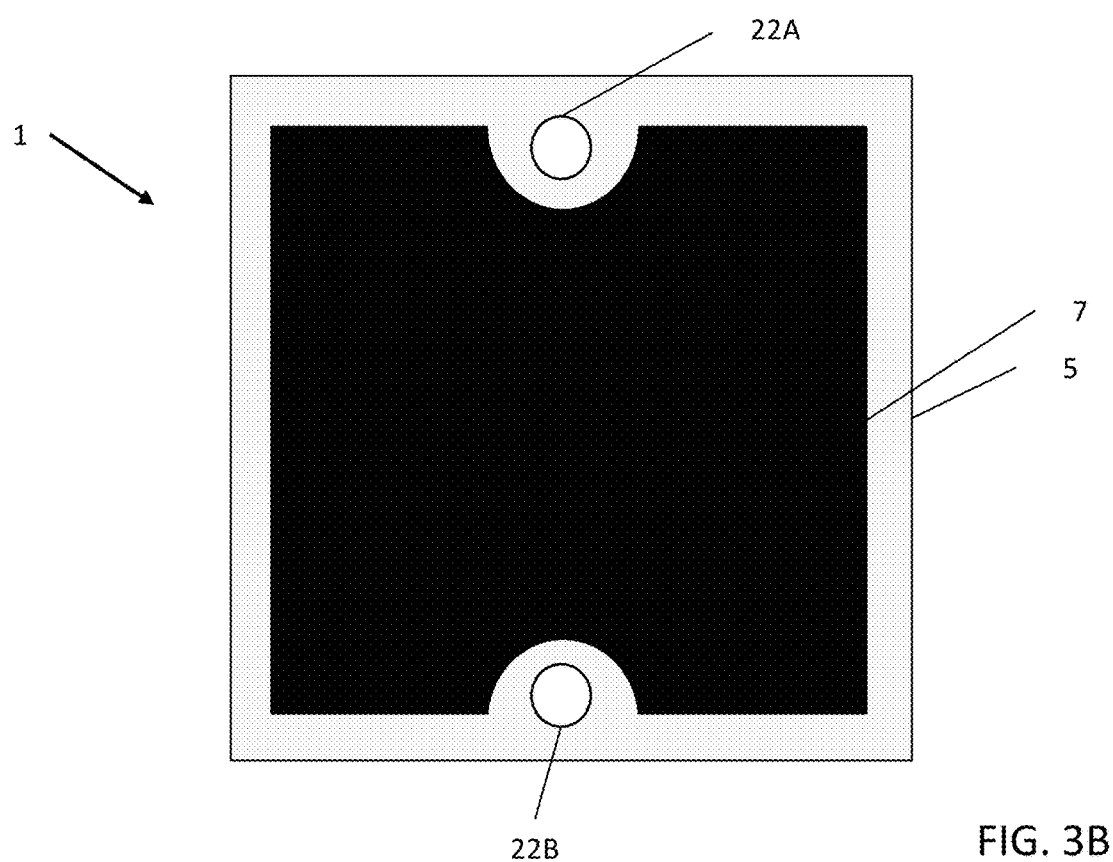
FIG. 3B is a plan view of a fuel side of the fuel cell of FIG. 3A.

FIG. 3A is a plan view of a cathode side (e.g., air side) of the fuel cell 1, and FIG. 3B is a plan view of an anode side (e.g., fuel side) of the fuel cell 1, according to various embodiments of the present disclosure. Referring to FIGS. 1A, 2A, 3A, and 3B, the fuel cell 1 may include an inlet fuel hole 22A, an outlet fuel hole 22B, the electrolyte 5, and the cathode 3. The cathode 3 may be disposed on a first side of the electrolyte 5. The anode 7 may be disposed on an opposing second side of the electrolyte 5.

The fuel holes 22A, 22B may extend through the electrolyte 5 and may be arranged to overlap with the fuel holes 22A, 22B of the interconnects 10, when assembled in the fuel cell stack 100. The cathode 3 may be printed on the electrolyte 5 so as not to overlap with the ring seals 20 and the peripheral seals 24 when assembled in the fuel cell stack 100. The anode 7 may have a similar shape as the cathode 3. The anode 7 may be disposed so as not to overlap with the frame seal 26, when assembled in the stack 100. In other words, the cathode 3 and the anode 7 may be recessed from the edges of the electrolyte 5, such that corresponding edge regions of the electrolyte 5 may directly contact the corresponding seals 20, 24, 26.

Figure 4:
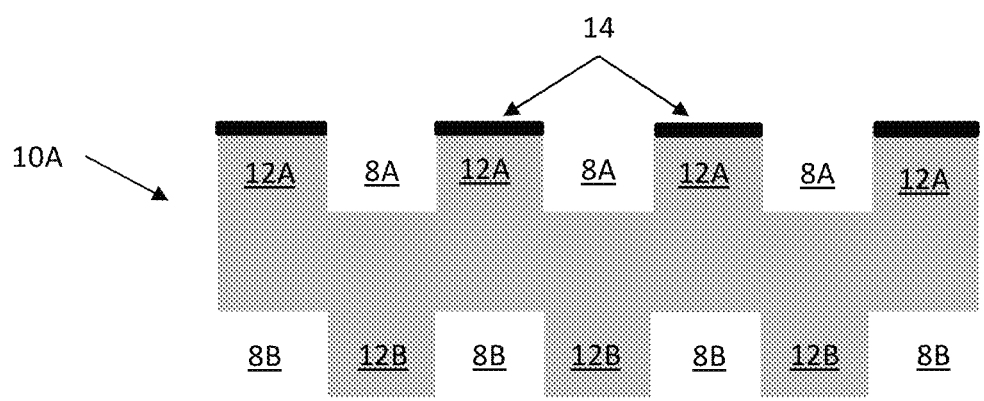
FIG. 4 is a cross-sectional view of an interconnect, according to an alternative embodiment of the present disclosure.

FIG. 4 is a cross-sectional view of an interconnect 10A, according to an alternative embodiment of the present disclosure. The interconnect 10A is similar to the interconnect 10 of FIGS. 1B, 2A and 2B, so only the differences therebetween will be discussed in detail.

Referring to FIG. 4, the interconnect 10A includes fuel-side ribs 12A that at least partially define fuel channels 8A, and air-side ribs 12B that at least partially define oxidant air channels 8B. However, unlike the interconnect 10, the channels 8A and 8B are laterally offset from each other, and the ribs 12A and 12B are laterally offset from each other (i.e., staggered in the lateral direction). As such, the overall thickness of the interconnect 10A may be reduced.

In addition, iron rich regions 14 may be included at the tips of the fuel-side ribs 12A. In other embodiments, the iron rich regions 14 may also be included on the walls of the fuel channels 8A. The iron-rich regions 14 may have greater than 10 wt. % iron, such as 15-99 wt. % iron, such as 25-75 wt. % iron, optionally 0 to 1 wt. % Y, and balance chromium. The regions 14 may operate to reduce area specific resistance degradation ("ASRD") between the interconnect 10A and an adjacent anode.

Interconnect Manufacturing

Conventionally, Cr—Fe alloy fuel cell interconnects are formed using a powder metallurgy process. For example, pure Cr and Fe powders are blended along with a binder and then powder pressed into the shape of an interconnect. This powder pressed part is then sintered in a hydrogen atmosphere at a high temperature for several hours, followed by oxidation at a high temperature. Using such a process, less than ten interconnects may be powder pressed every minute.

However, the total manufacturing line capital costs of such a powder pressing system are high. In addition, due to the low compressibility of Cr—Fe powder, tooling and operating costs per line may also be very high. For example, pressing may require the use of very large presses, in conjunction with high tooling costs, due to frequent required refacing of tooling. In addition, high-temperature hydrogen sintering is also an expensive process. Due to such high capital costs and high operating costs, interconnect production cost reduction remains difficult to achieve using powder metallurgy. In addition, conventional powder metallurgy processes may produce interconnects that suffer from density variations, due to the cross-sectional thickness variations produced during the pressing process. Such variations may also result in interconnect warping after sintering.

Accordingly, various embodiments provide a 3D printing process for forming fuel cell interconnects. In particular, the method may include using direct metal laser sintering (DMLS) to form a fuel cell interconnect from a pre-alloyed metal powder suitable for DMLS 3D printing.

Figure 5:
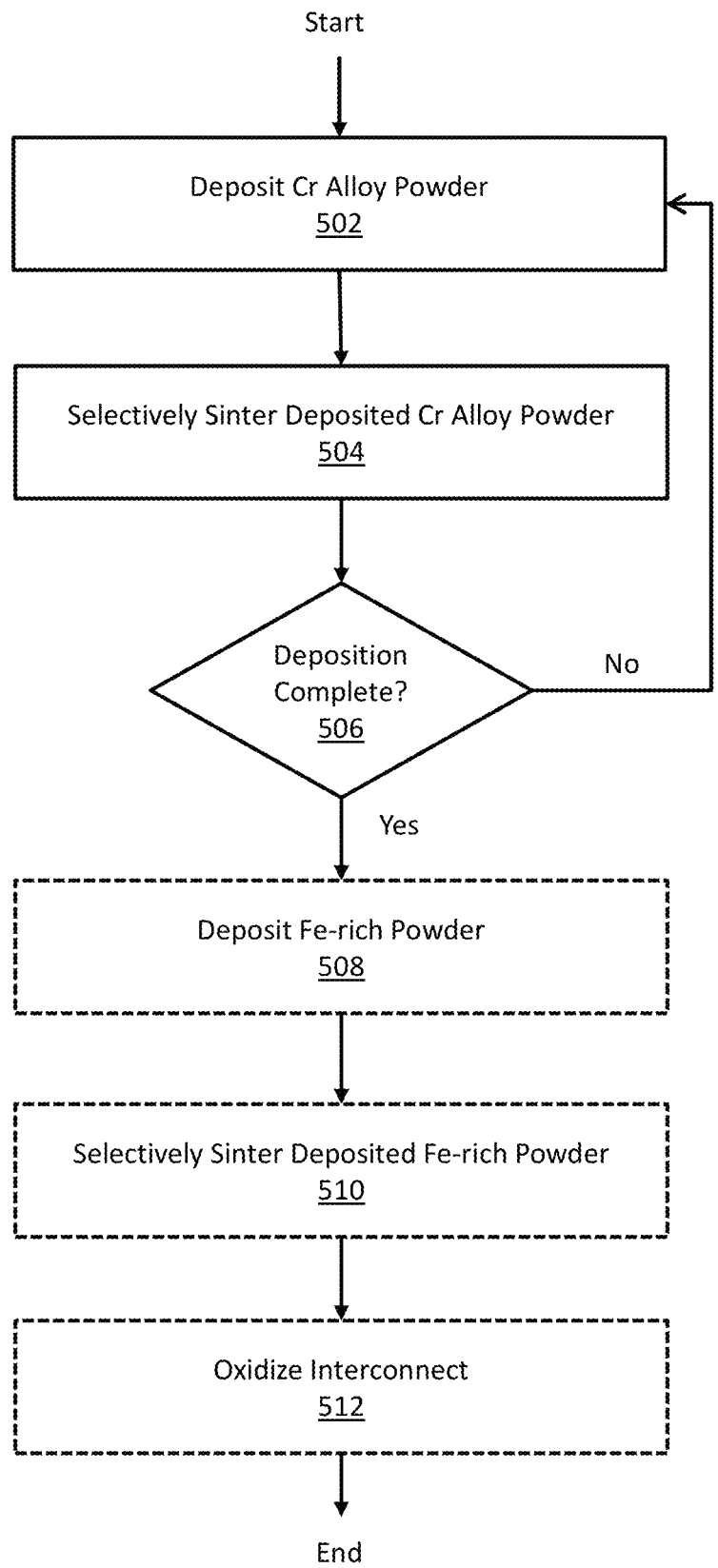
FIG. 5 is a block diagram of a method of forming a fuel cell stack, according to various embodiments of the present disclosure.

FIG. 5 is a block diagram showing a method of forming a fuel cell interconnect using 3D DMLS, according to various embodiments of the present disclosure. Referring to FIG. 5, in step 502, the method may include depositing a pre-alloyed chromium (Cr) alloy powder (referred to as "Cr alloy powder" hereafter) over a substrate of a 3D printing apparatus. In particular, powder may be deposited directly on the substrate or on a previously deposited portion of the powder or sintered interconnect portion. The Cr alloy powder may comprise a chromium-iron alloy, such as 4-6 weight percent iron, optionally 1 or less weight percent yttrium, and a balance of chromium alloy. For example, the powder may include a pre-alloyed Cr-5 wt. % Fe powder. In other words, at least 90%, such as 90 to 100% of the powder particles of the Cr alloy powder each comprise an alloy of Cr and Fe. In some embodiments, the powder may optionally include a binder.

In step 504, the deposited Cr alloy powder may be irradiated with radiation to selectively sinter the Cr alloy powder. In particular, the Cr alloy powder may be laser sintered by irradiating the Cr alloy powder with a laser beam (e.g., visible light laser beam, infrared laser beam or ultraviolet laser beam). The laser sintering may use a single laser source or multiple laser sources, such as a duel laser source system. In one embodiment, the Cr alloy powder is selectively laser irradiated in a desired pattern (e.g., a pattern of ribs and channel) to selectively melt and fuse the powder into the shape of a cross-sectional portion of the interconnect. The Cr alloy powder may be deposited in a desired pattern (e.g., a pattern of ribs and channels) prior to the sintering. Alternatively, the Cr alloy powder may be deposited as a continuous, unpatterned layer of Cr alloy powder which is then selectively laser sintered, followed by removal of any remaining unsintered powder. The speed and or strength of the laser beam irradiation may be controlled to achieve a density of at least 6 gm/cc, such as a density of at least 6.9 gm/cc, e.g., 6 to 8 gm/cc.

In some embodiments, the deposition and/or sintering may occur in a controlled atmosphere. In particular, while not wishing to be bound to a particular theory, it is believed that chromium does not sinter efficiently in air. As such, the deposition and/or sintering may occur in an inert atmosphere, such as an atmosphere comprising or consisting essentially of an inert gas, such as argon (Ar). Other noble gases (e.g., helium, etc.) may be used instead of or in addition to argon.

However, in other embodiments, the deposition and/or sintering may occur in a controlled atmosphere comprising an oxidant such as oxygen ($O_2$) alone or in combination with an inert gas (e.g., noble gas, such as argon). For example, the controlled atmosphere may comprise or consists essentially of a mixture of an inert gas such as Ar and an oxidant such as $O_2$. In some embodiments, the controlled atmosphere may comprise from about 5 vol % to about 20 vol % $O_2$, such as from about 8 to about 18 vol % $O_2$, and balance argon based on the total volume of the controlled atmosphere. Accordingly, the interconnect may be at least partially oxidized during the sintering, (e.g., the method may include laser-enhanced oxidation). The oxidation may operate to seal pores in the interconnect and/or increase the thermal and dimensional stability of the interconnect. Therefore, the expensive sintering at a high temperature in a hydrogen atmosphere may be omitted to reduce the cost of the process.

In step 506, a determination is made as to whether the Cr alloy powder deposition is complete. In particular, a determination is made as to whether the deposition and sintering processes are complete, or if additional Cr alloy powder deposition steps are needed. If additional Cr alloy powder deposition steps are needed, the method returns to step 502. If no additional Cr alloy powder deposition steps are needed, then an interconnect may be output and the method may end. In the alternative, the method may proceed to one or more of optional steps 508, 510, and 512.

In some embodiments, optional step 508 may include depositing a Fe-rich powder on the interconnect. In particular, the Fe-rich powder may be deposited on a fuel side of the interconnect, such as on top of the fuel side ribs 12A of the interconnect 10 or 10A. The Fe-rich powder contains a higher iron content than the Cr alloy powder used in step 502 to form the interconnect 10 or 10A. For example, the Fe-rich powder may comprise pure iron powder, a pre-alloyed Cr—Fe powder containing 10 wt. % or more iron, such as 15-99 wt. % iron, such as 25-75 wt. % iron, and balance Cr, or a mixture of pure iron and pure chromium powders. If a mixture of pure iron and pure chromium powders is used, then the mixture contains 10 wt. % or more iron, such as 15-99 wt. % iron, such as 25-75 wt. % iron, and balance Cr.

In optional step 510, the Fe-rich powder may be selectively laser-sintered. For example, the Fe-rich powder may be selectively sintered onto tops of fuel side ribs 12A of the interconnect 10 or 10A. Accordingly, step 510 may form the iron-rich regions 14 on the tops of the fuel side ribs 12A. Optional steps 508 and 510 may be repeated several times to reach the desired thickness of the iron-rich regions 14.

In optional step 512, the interconnect may be oxidized. For example, the interconnect may be disposed in a substantially pure oxygen environment or a mixture of inert gas (e.g., argon) and oxygen, and heated to a temperature ranging from about 850° C. to about 1200° C., such as about 1000° C. to about 1100° C. The oxidation may be performed using rapid thermal oxidation (i.e., laser or lamp heating in an oxidizing environment for 5 minutes or less) or furnace oxidation. The oxidation of step 512 may be performed in addition to, or in place of, the oxidation that occurs when the atmosphere of step 504 includes an oxidant (e.g., oxygen). In other embodiments, step 512 may be omitted if the interconnect is sufficiently oxidized during step 504. After oxidation, a surface portion of the oxidized chromium-iron alloy may optionally be removed from exposed surfaces of the interconnect by grinding, grit blasting, sand blasting, etc.

The 3D printing methods of the embodiments of the present disclosure provide advantages compared to conventional power metallurgy pressing methods for forming interconnects. For example, the embodiment methods do not require compression of Cr alloy powder, and thus, do not require the associated expensive tooling and presses. The embodiment methods also do not require the expensive hydrogen ambient sintering at a high temperature, and may combine the sintering and oxidation processes into a single laser sintering and oxidation step. Therefore, the embodiment methods provide for lower capital and manufacturing costs. In addition, the embodiment methods may provide improved cross-sectional interconnect densities (e.g., produce interconnects having more uniform densities). The embodiment methods may also provide for higher manufacturing output per production line, and allow for the production of interconnects at a lower unit cost.

Although the foregoing refers to particular preferred embodiments, it will be understood that the invention is not so limited. It will occur to those of ordinary skill in the art that various modifications may be made to the disclosed embodiments and that such modifications are intended to be within the scope of the invention. All of the publications, patent applications and patents cited herein are incorporated herein by reference in their entirety.

What is claimed is:

1. A method of forming a fuel cell interconnect, comprising:
   depositing a Cr alloy powder;
   sintering the Cr alloy powder;
   repeating the depositing and the sintering to form the fuel cell interconnect comprising fuel-side ribs that at least partially define fuel channels;
   depositing a Fe-rich powder on a fuel side of the interconnect; and
   selectively sintering the Fe-rich powder to selectively form Fe-rich regions only on tops of fuel-side ribs, wherein:
   the Cr alloy powder comprises pre-alloyed chromium iron alloy particles containing:
     from about 4 wt. % to about 6 wt. % Fe; and
     from about 94 wt. % to about 96 wt. % Cr, and
   the Fe-rich powder has a higher Fe content than the Cr alloy powder and comprises pre-alloyed Cr—Fe alloy particles containing 25 wt. % to 75 wt. % Fe and balance Cr.

2. The method of claim 1, wherein the sintering the Cr alloy powder comprises using at least one laser source to laser sinter the Cr alloy powder.

3. The method of claim 2, wherein the sintering the Cr alloy powder comprises irradiating the Cr alloy powder with a laser beam in an inert atmosphere.

4. The method of claim 3, wherein the inert atmosphere comprises an argon atmosphere.

5. The method of claim 2, further comprising oxidizing the interconnect.

6. The method of claim 5, wherein the oxidizing comprises heating the interconnect in an oxidizing atmosphere.

7. The method of claim 6, wherein:
   the oxidizing atmosphere comprises oxygen; and
   the heating comprises rapid thermal oxidation.

8. The method of claim 6, wherein:
   the oxidizing atmosphere comprises oxygen; and
   the heating comprises furnace heating.

9. The method of claim 5, wherein the sintering the Cr alloy powder and the oxidizing are performed concurrently during a same step.

10. The method of claim 9, wherein the concurrent sintering and oxidizing step comprises irradiating the Cr alloy powder with a laser beam in an atmosphere comprising an oxidant which oxidizes the Cr alloy powder.

11. The method of claim 10, wherein the atmosphere consists essentially of argon and oxygen.

12. The method of claim 1, wherein the interconnect further comprises-air-side ribs that at least partially define air channels.

13. The method of claim 1, wherein the step of selectively sintering the Fe-rich powder comprises selective laser sintering.

14. The method of claim 1, wherein the Fe-rich powder comprises a pure iron powder.

15. The method of claim 1, wherein the Fe-rich powder comprises a mixture of pure iron and pure chromium powders, and wherein the mixture contains at least 10 wt. % iron and balance Cr.

16. The method of claim 1, wherein the interconnect further comprises a fuel inlet hole and a fuel outlet hole.

17. The method of claim 1, further comprising placing the interconnect into a solid oxide fuel cell stack.

18. A method of forming a fuel cell interconnect, comprising:
   depositing a pre-alloyed Cr—Fe alloy powder comprising from about 4 wt. % to about 6 wt. % Fe;
   sintering the Cr—Fe alloy powder;
   repeating the depositing and the sintering to form the fuel cell interconnect comprising fuel-side ribs that at least partially define fuel channels;
   depositing a Fe-rich pre-alloyed Cr—Fe powder comprising 25 wt. % to 75 wt. % Fe on a fuel side of the interconnect; and
   using at least one laser source to selectively sinter the Fe-rich pre-alloyed Cr—Fe powder to selectively form Fe-rich regions only on tops of the fuel-side ribs.

* * * * *